United States Patent
Kurisu et al.

(10) Patent No.: US 12,417,482 B2
(45) Date of Patent: Sep. 16, 2025

(54) INFORMATION PROCESSING DEVICE, INFORMATION PROCESSING METHOD, AND PROGRAM

(71) Applicant: JAPAN TOBACCO INC., Tokyo (JP)

(72) Inventors: Toshiharu Kurisu, Tokyo (JP); Shin Watanabe, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 315 days.

(21) Appl. No.: 18/025,714

(22) PCT Filed: Sep. 17, 2021

(86) PCT No.: PCT/JP2021/034423
§ 371 (c)(1),
(2) Date: Mar. 10, 2023

(87) PCT Pub. No.: WO2022/065259
PCT Pub. Date: Mar. 31, 2022

(65) Prior Publication Data
US 2023/0368266 A1    Nov. 16, 2023

(30) Foreign Application Priority Data
Sep. 23, 2020 (JP) .................. 2020-158759

(51) Int. Cl.
*G06Q 30/00* (2023.01)
*G06F 3/16* (2006.01)
(Continued)

(52) U.S. Cl.
CPC ......... *G06Q 30/0631* (2013.01); *G06F 3/167* (2013.01); *G06F 40/35* (2020.01); *G06Q 30/0641* (2013.01)

(58) Field of Classification Search
CPC ............................................. G06Q 30/06–08
See application file for complete search history.

(56) References Cited

U.S. PATENT DOCUMENTS

2009/0210321 A1*  8/2009  Rapp .................... G06Q 10/101
                                                707/999.005
2012/0226698 A1*  9/2012  Silvestre ................ G06Q 30/02
                                                707/E17.084
(Continued)

FOREIGN PATENT DOCUMENTS

JP        2015-035189 A       2/2015

OTHER PUBLICATIONS

Kotonya, Neema, et al., "Of Wines and Reviews: Measuring and Modeling the Vivino Wine Social Network", Proceedings of hte IEEE/ACM International Conference on Advances in Social Networks Analysis and Mining, Sep. 13, 2018 (Year: 2018).*

(Continued)

*Primary Examiner* — Ethan D Civan
(74) *Attorney, Agent, or Firm* — Oliff PLC

(57) ABSTRACT

An information processing device includes an access means accessing a database recording a plurality of words indicating, for each of a plurality of objects, flavor or aroma of an object; a presenting means presenting to a user an object to be used from among a set of determined objects in order; a display control means for causing a display means to display a plurality of words obtained from the database indicating the flavor or aroma of the object to be used; a receiving means receiving a selection of the flavor or aroma sensed by user using the object to be used and the input of the preference; and an output means outputting words that shows the tendency of the user's preference according to the selection and the input, in a case that the selection and the input are received regarding all the objects that constitute the set of determined objects.

8 Claims, 10 Drawing Sheets

(51) Int. Cl.
  *G06F 40/35* (2020.01)
  *G06Q 30/0601* (2023.01)

(56) References Cited

U.S. PATENT DOCUMENTS

| | | | | |
|---|---|---|---|---|
| 2013/0080438 A1* | 3/2013 | Tompkins | ......... | G06F 16/24578 |
| | | | | 707/740 |
| 2013/0339179 A1* | 12/2013 | Pickelsimer | ....... | G06Q 30/0631 |
| | | | | 705/26.7 |
| 2014/0172642 A1* | 6/2014 | Zhang | ................ | G06F 16/9535 |
| | | | | 705/26.62 |
| 2018/0218892 A1* | 8/2018 | Yamaguchi | ......... | H01J 49/0009 |

OTHER PUBLICATIONS

Dec. 7, 2021 Search Report issued in International Patent Application No. PCT/JP2021/034423.

Jul. 18, 2024 Extended European Search Report issued in European Patent Application No. 21872388.0.

* cited by examiner

| ID | 001 | 002 | 003 |
|---|---|---|---|
| SET NAME | IBARAKI | MIYAGI | ... |
| 1 | Ame Tsukuba | Urasumi | ... |
| 2 | Namazake Houkyo | Koedakami | ... |
| 3 | Takeo | ... | ... |
| 4 | Sato no Homare | ... | ... |
| 5 | Chi | ... | ... |
| 6 | Kohaku | ... | ... |
| 7 | Sabazaki | ... | ... |
| 8 | Funato | ... | ... |
| 9 | Hino Irizuru | ... | ... |
| 10 | Funato Junmai Daiginjo | ... | ... |

FIG. 4

| Ame Tsukuba | | | | | | |
|---|---|---|---|---|---|---|
| LINEAGE | COOL | | FULL BODY | | WARM | |
| | 2 | | 4 | | 1 | |
| FLAVOR REPRESENTAION | Kaiware | 1 | Shimeji Mushroom | 4 | Black Cherry | 2 |
| | Japanese honeywort | 1 | Peanut | 1 | | |
| | | | Kinako | 2 | | |
| | | | Beech Tree | 1 | | |
| | | | White Mushroom | 1 | | |
| | | | Chestnut Jam | 1 | | |
| METAPHORICAL EXPRESSION | Sunlight filtering through trees with green leaves | | Peaceful rural landscape, Graceful morning glow, sky of the hometown | | | |
| SENSIBILITY EXPRESSION | Aftertaste crisp / Aroma moderate | | | | | |

FIG. 5

PLEASE INPUT YOUR PROFILE

| | |
|---|---|
| RESIDENCE | CHIBA |
| AGE | 36 |
| GENDER | FEMALE |

Frequency of drinking Japanese rice wine: ☐ Never ☐ Everyday ☑ Once a week ☐ Once a month

TRANSMIT

FIG. 6

| SET NAME | IBARAKI | PREFERENCE | FLAVOR REPRESENTATION |
|---|---|---|---|
| 1 | Ame Tsukuba | LIKE | Kinako Chestnut Jam |
| 2 | Namazake Houkyo | LIKE | Green Apple |
| 3 | Takeo | NEITHER | Lemmon |
| 4 | Sato no Homare | NEITHER | — |
| 5 | Chi | DISLIKE | Coconut |
| 6 | Kohaku | NEITHER | Kabosu Kiwi Fruit |
| 7 | Sabazaki | NEITHER | Cucumber |
| 8 | Funato | LIKE | Kinako Cacao |
| 9 | Hino Irizuru | NEITHER | Apricot Kernel |
| 10 | Funato Junmai Daiginjo | LIKE | Kinako Cacao |

FIG. 9

Your Preference For Japanese Rice Wine is: /95
Full Body Type
Kinako and Cacao Flavor
For example, the following:
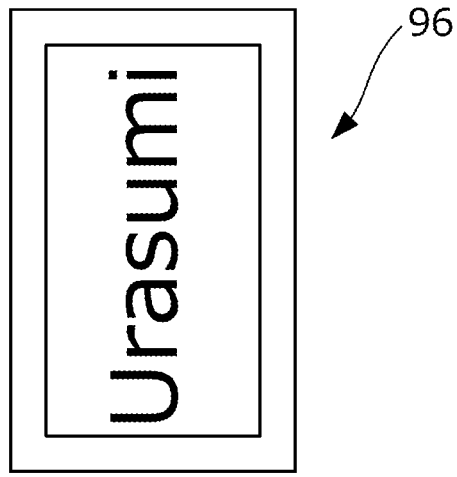
Urasumi (Miyagi)
Sara Sake Brewery
FIG. 10

INFORMATION PROCESSING DEVICE, INFORMATION PROCESSING METHOD, AND PROGRAM

TECHNICAL FIELD

The present invention relates to a technique for verbalizing a user's preference for an object.

RELATED ART

Techniques for visualizing user preferences are known. For example, Patent Document 1 discloses a technique of visualizing a user's preference by arranging a history of a user searching for content on a two-dimensional coordinate axis including a time axis.

PRIOR ART

Patent Document

Patent Document 1: JP 2015-035189A

SUMMARY

Problem to be Solved

In Patent Document 1, a user's preference for an object cannot be converted into language. In contrast, the present invention provides a technique for verbalizing a user's preference for an object.

Solution (note: claims will be copied here)

Advantageous Effects

The present invention enables a user's preference for an object to be translated into language.

BRIEF DESCRIPTION OF THE DRAWINGS

FIG. 4 shows a diagram illustrating database 112.

FIG. 5 shows a diagram illustrating database 111.

FIG. 6 is a diagram illustrating a UI window for receiving an input of attribute information.

FIG. 9 shows feedback information of a transmitter.

FIG. 10 shows an example of a screen displayed on client terminal 20.

DESCRIPTION OF REFERENCE NUMERALS

1 . . . Information processing system, 10 . . . Server, 11 . . . Storage means, 12 . . . Presenting means, 14 . . . Display control means, 15 . . . Receiving means, 17 . . . Specifying means, 18 . . . Outputting means, 20 . . . Client terminal, 91 . . . Display area, 92 . . . Display area, 93 . . . Display area, 96 . . . Display area, 97 . . . Display area, 101 . . . CPU, 102 . . . Memory, 103 . . . Storage, 104 . . . Communication IF, 11 . . . Database, 12 . . . Database, 201 . . . CPU, 202 . . . Memory, 203 . . . Storage, 204 . . . Communication IF, 205 . . . Input device, 206 . . . Output device, 921 . . . Flavor map, 931 . . . UI object, 932 . . . UI object

DETAILED DESCRIPTION

1. Configuration

Figure 1:
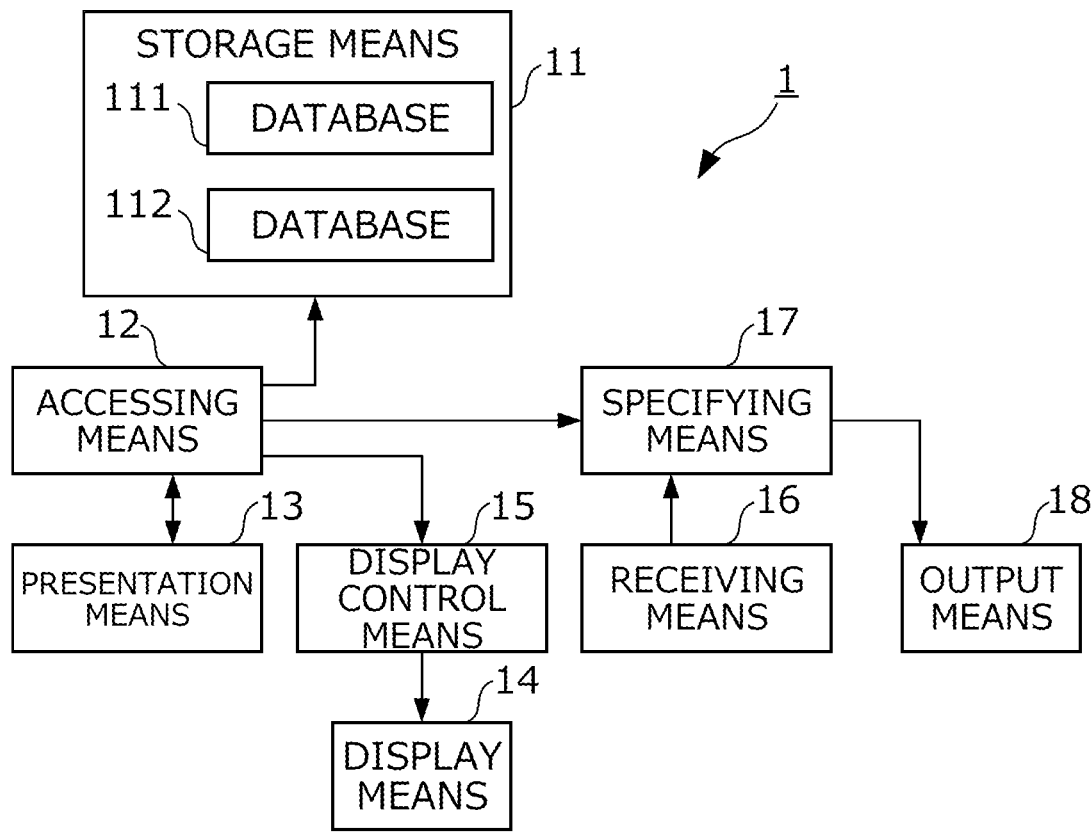
FIG. 1 shows an example of a functional configuration of an information processing system 1 according to an embodiment.

FIG. 1 shows an example of a functional configuration of information processing system 1 according to an embodiment. Information processing system 1 is a system that receives an input of a flavor sensed when a user actually uses a set of objects, and converts the user's preference into language based on the input.

Information processing system 1 includes storage means 11, accessing means 12, presentation means 13, display means 14, display control means 15, receiving means 16, specifying means 17, and output means 18. Storage means 11 stores various data and programs. In this example, storage means 11 stores database 111. Database 111 is a database that records, for each of a plurality of objects, a plurality of words indicating the flavor or aroma of the object. Accessing means 12 accesses database 111. Presentation means 13 presents to the user, in order, the objects to be used from among the set of determined objects. The number N of objects included in one set of objects is predetermined by information processing system 1. Display means 14 displays a variety of information. Display control means 15 causes display means 14 to display a plurality of word(s) indicating the flavor or aroma of each object to be used, which is obtained from database 111. Receiving means 16 receives a selection of the flavors or aromas sensed by the user using the objects to be used from among the plurality of words, and the input of the preference for the objects to be used. In response to completing the selection and the input for all objects constituting a set of objects, specifying means 17 specifies a word(s) indicating a tendency of the preference of the user according to the selection and the input. Output means 18 outputs the word(s) specified by specifying means 17.

In this example, output means 18 outputs information for specifying another object not included in the set of objects among the plurality of objects to be recommended to the user. The other object is an object selected in accordance with a word(s) indicating a tendency of a preference of the user.

Figure 2:
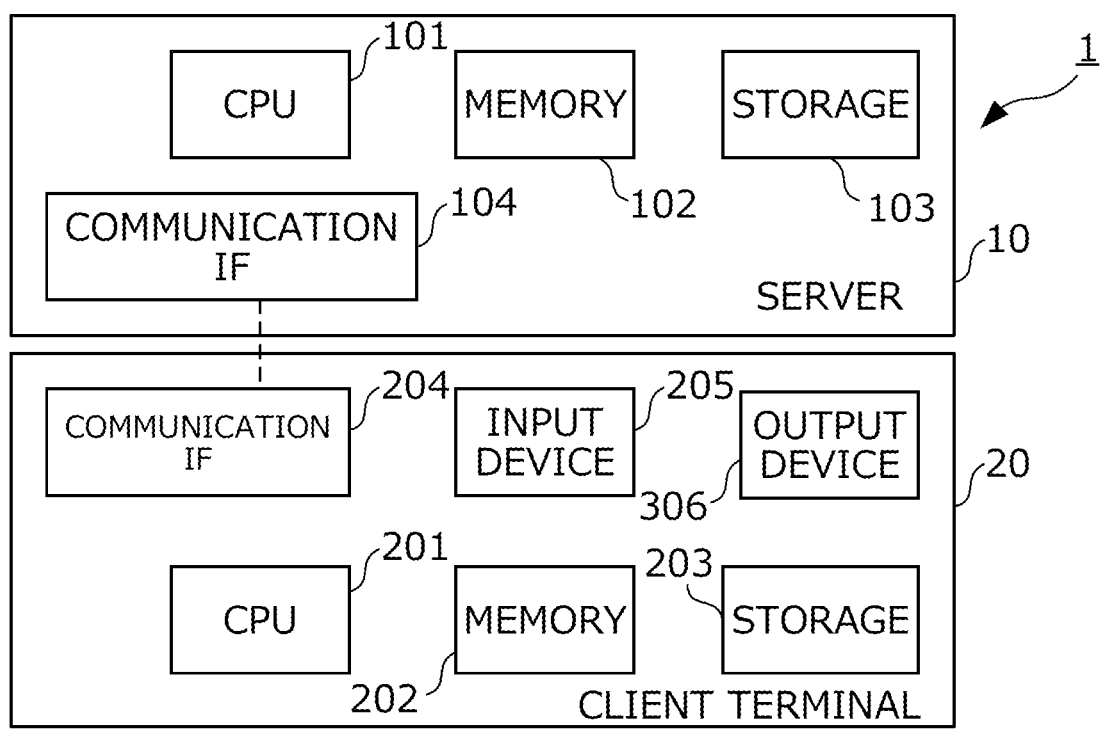
FIG. 2 shows a hardware configuration of information processing system 1.

FIG. 2 shows an exemplary hardware configuration of information processing system 1. In this example, information processing system 1 includes server 10 and client terminal 20. Server 10 is an information processing device or a computer device having CPU 101, memory 102, storage 103, and communication IF 104. CPU 101 is a processing unit that performs various operations according to a program. Memory 102 is a main storage device that functions as a work area when CPU 101 executes a program, and includes, for example, a RAM (Random Access Memory). Storage 103 is an auxiliary storage device that stores various types of data/programs, and includes at least one of an SSD (Solid State Drive) and an HDD (Hard Disk Drive). Communication IF 104 is a device that communicates with other devices according to a predetermined standard (e.g., Ethernet), and includes, for example, an NIC (Network Interface Card.

In this example, the program stored in storage 103 includes a program (hereinafter referred to as a "server program") for causing the computer device to function as a server of information processing system 1. When CPU 101 executes the server program, the functions shown in FIG. 1 are implemented in the computer device. While CPU 101 is executing the server program, at least one of memory 102 and storage 103 is an example of storage means 11. CPU 101 is an exemplary specifying means 17. CPU 101 and communication IF104 are examples of accessing means 12, presentation means 13, display control means 15, receiving means 16, and outputting means 18.

Client terminal 20 is an information processing device or a computer device including CPU 201, memory 202, storage 203, communication IF 204, inputting device 205, and outputting device 206; more specifically, for example, a smart phone, a tablet terminal, or a personal computer. CPU 201 is a processor that performs various operations according to a program. Memory 202 is a main storage device that functions as a work area when CPU 201 executes the program, and includes, for example, a RAM. Storage 203 is an auxiliary storage device for storing various data and programs, including, for example, an SSD. Communication IF 204 is a device that communicates with other devices according to a predetermined standard (for example, LTE (Long Term Evolution) or WiFi (registered trademark), and includes, for example, an LTE antenna and a chipset. Input device 205 is a device for inputting data or an instruction to client terminal 20, and includes, for example, at least one of a touch screen, a keyboard, and a microphone. Output device 206 is a device for outputting information, and includes, for example, a display and a speaker.

In this example, the program stored in the storage 203 includes a program (hereinafter referred to as a "client program") for causing the computer device to function as a client terminal of information processing system 1. The client program is a general-purpose web browser or a dedicated application program. When CPU 201 executes the client program, the functions shown in FIG. 1 are implemented in the computer device. When CPU 201 is executing the client program, output device 206 is an example of display means 14.

2. Operation

Figure 3:
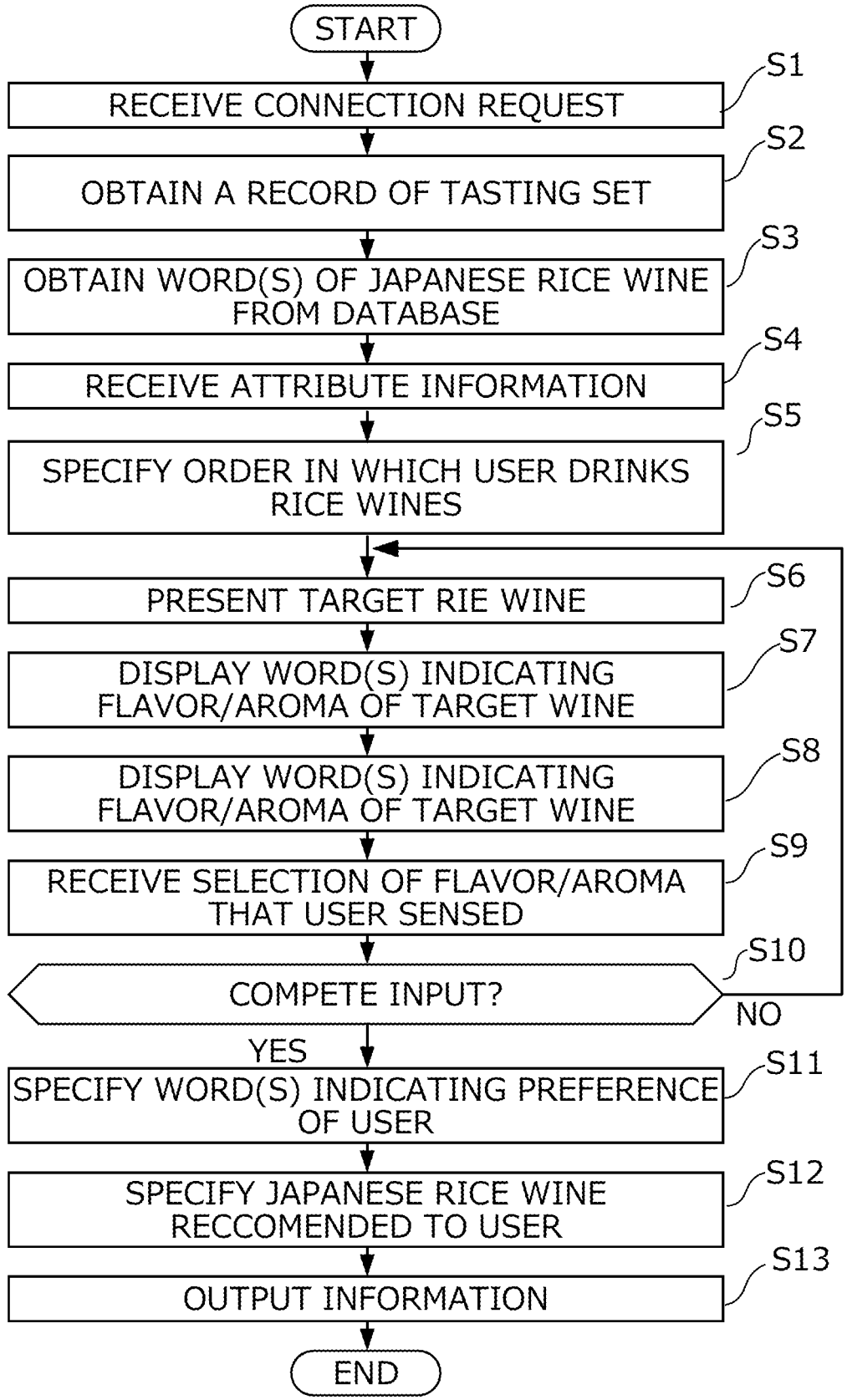
FIG. 3 shows a flowchart showing an operation of information processing system 1.

FIG. 3 is a flowchart illustrating an operation of information processing system 1. Here, an operation of information processing system 1 will be described assuming the following use scene. A retail store (e.g., a department store) sells a tasting set of Japanese rice wine. The tasting set includes ten bottles of Japanese rice wine with various tastes. Here, the ten bottles of Japanese rice wine are an example of a set of objects (N=10). In this example, the object is food/drink, and the use of the object is consumption of the food/drink. This tasting set includes a leaflet. In this leaflet, a URL of a service site of information processing system 1 is described, for example, in the form of a two-dimensional image code (specifically, a QR code (registered trademark)). The user who purchased the tasting set returns home to open the commodity and accesses the service site (provided by server 10) from his/her smartphone (an example of client terminal 20). In the following description, functional elements such as storage means 11 may be described as a main part of processing, but this means that hardware elements such as a CPU 101 that executes software such as a server program cooperate with other hardware elements to execute processing.

At step S1, server 10 receives a connection request from client terminal 20 to the service site. This connection request includes an ID of the tasting set. In information processing system 1, storage means 11 stores database 112. In database 112, ID of the tasting set and the information for specifying a name of Japanese wine included in the tasting set are recorded prior to the flow shown in FIG. 3.

FIG. 4 is a diagram illustrating database 112. Database 112 includes a plurality of records. Each record corresponds to a set of tasting sets and includes information identifying the set name or name of the tasting set and the brand of Japanese rice wine included in the tasting set. For example, the record in the leftmost column of the figure shows that the tasting set of ID"001 is the set name "Ibaraki Prefecture," and that this tasting set includes 10 bottles of Japanese rice wine whose names are "Ame Tsukuba," "Namazake Houkyo," "Takeo," "Sato no Homare," "Chi," "Kohaku," "Sabazaki," "Funato," "Hino Irizuru," and "Funato Junmai Daiginjo."

Further, in database 112, information defining the order of drinking Japanese rice wine in the tasting set is recorded. In this example, the order from top to bottom in the figure is defined as the order of drinking Japanese rice wine. Further, although not shown, database 112 or another database may record attribute information of each Japanese rice wine; for example, a place of production (prefecture name), a manufacturer name, a price, a link to a mail order site, and the like.

Referring to FIG. 3 again, at step S2, accessing means 12 accesses database 112 and obtains a record of the tasting set having the same ID as ID included in the connecting request received from client terminal 20. At step S3, accessing means 12 accesses database 111 and obtains a word(s) indicating the flavor or aroma of the Japanese rice wine included in the tasting set.

FIG. 5 is a diagram illustrating database 111. Database 111 includes a plurality of records. Each record corresponds to one type of Japanese rice wine, and includes a numerical value indicating the intensity of a connection between the Japanese rice wine and a predetermined words (for example, the intensity of flavor). The words recorded in database 111 are classified into four types: lineage, flavor representation, metaphorical expression, and sensibility expression.

The lineage is the highest classification in this example, and includes three elements: "cool," "full body," and "warm." A numerical value indicating the composition of these three elements is recorded in database 111. To avoid an evaluation that the balance of all the elements is equal, the sum of the numerical values indicating the balance of these three elements is set to be a value (for example, 7) that is not divisible by 3. In addition, to make it easier to identify the dominant element among the three elements, a value is set so that the value of any one element is maximized (for example, such a value is not set because the balance of cool:full body:wrm=3:3:1 does not indicate whether cool or full body is dominant). This total setting value is common for all Japanese rice wine (i.e. the total value of these three elements for all Japanese rice wine is 7). For example, the Japanese rice wine "Ame Tsukuba" is cool:full body: warm=2:4:1, and the Japanese rice wine "Takeo" is cool:full body:warm=5:1:1.

The flavor expression represents the flavor or aroma contained in the Japanese rice wine by the names of other foodstuffs or plants such as pineapples, lemons, and apples. In database 111, the intensity of each flavor is recorded. Specifically, a value of zero is recorded for a flavor that cannot be sensed from the Japanese rice wine, and a value indicating the intensity of the flavor is recorded for a flavor that is sensed from the Japanese rice wine. This value is relative, and "1" indicates the weakest flavor as perceived, and the higher the flavor, the higher the value. Several flavors may be sensed from one bottle of Japanese rice wine. Each of the plurality of flavors belongs to (i.e., is associated with) a single lineage. For example, the flavor "kaiware" belongs to the lineage "cool" and the flavor "shimeji mushroom" belongs to the lineage "full body." In the example shown in the figure, the Japanese rice wine "Ame Tsukuba" has a flavor of "1" in all of kaiware, Japanese honeywort, peanuts, beech trees, mushrooms, and chestnut bean paste, a flavor of "2" in leaf flour and black cherry, and a flavor of "4" in shimeji mushroom. Unlike the lineage, there is no limit on the sum of the numerical values for flavor representations.

The metaphorical expression expresses the flavor or aroma of the Japanese rice wine by a noun with a modifier such as "The sun sank on the Gulf Line," "Beach in South Country," or "Memories of first love." At least one metaphorical representation is recorded in database 111 for each Japanese rice wine. Each metaphorical expression contains one of a plurality of adjective components. In the example of the figure, Japanese rice wine called "Ame Tsukuba" contains the phrase "Sunlight filtering through trees with green leaves" as a metaphoric representation of the "cool" line, and the three phrases the "full body" line metaphorical expression of the "full body" line including "Peaceful rural landscape," "Graceful morning glow," and "sky of the hometown" (the metaphorical expression of the "warm" line is not included here). In this example, no intensity is recorded for the metaphor.

Sensitive expressions are expressions expressing the flavor or aroma of Japanese rice wine using adjectives such as "Mild" or "Crisp." At least one sensitive expression is recorded in database 111 for each Japanese rice wine. In the example shown in the figure, the words "Aftertaste crisp" and "Aroma moderate" are recorded in Japanese rice wine called "Ame Tsukuba." In this example, the sensibility representations are not associated with the lineage elements, and the intensities are not recorded.

In this example, the numbers and phrases recorded in database 111 are language or quantifications of the flavor or aroma that a particular one or a small number of experts (e.g., Japanese rice wine sommeliers) actually sensed drinking the Japanese rice wine.

At step S3, accessing means 12 obtains, from the database 111, a record of the Japanese rice wine contained in the tasting set. This record contains word(s) indicating the flavor or aroma of the Japanese rice wine.

Referring to FIG. 3 again, at step S4, receiving means 16 receives the attribute information from the user. Specifically, display control means 15 transmits, to client terminal 20, data for displaying a UI window for inputting the attribute information. Display means 14 of client terminal 20 displays a UI window in accordance with the data.

FIG. 6 is a diagram exemplifying a UI window for receiving an entry of attribute information. In this example, attribute information of four items of "place of residence," "gender," "age," and "frequency of drinking Japanese rice wine" is received as attribute information of the user. When the user presses a transmission button by inputting information to each item, the attribute information is transmitted to server 10. In server 10, receiving means 16 receives the attribute information. Storage means 11 stores the attribute information together with the identification information temporarily allocated to the user of the session.

Referring to FIG. 3 again at step S5, presentation means 13 specifies the order in which the user drinks Japanese rice wine, that is, drinks Japanese rice wine. Hereinafter, the Japanese rice wine that the user should drink next is referred to as "target Japanese rice wine." The target Japanese rice wine is an example of an object to be used. The order of drinking in the tasting set is defined in database 112. In the example of the tasting set "Ibaraki Prefecture, "Ame Tsukuba" is specified as the first target Japanese rice wine.

At step S6, presentation means 13 presents the target Japanese rice wine to the user. Presentation means 13 causes display means 14 in client terminal 20 to display, for example, a message "Please drink "Ame Tsukuba" via display control means 15.

At step S7, display control means 15 causes the display means to display a word(s) indicating the flavor or aroma of the target Japanese rice wine. In this example, the presentation of the target Japanese rice wine and the display of a plurality of words indicating its flavor or aroma are performed on one screen.

Figure 7:
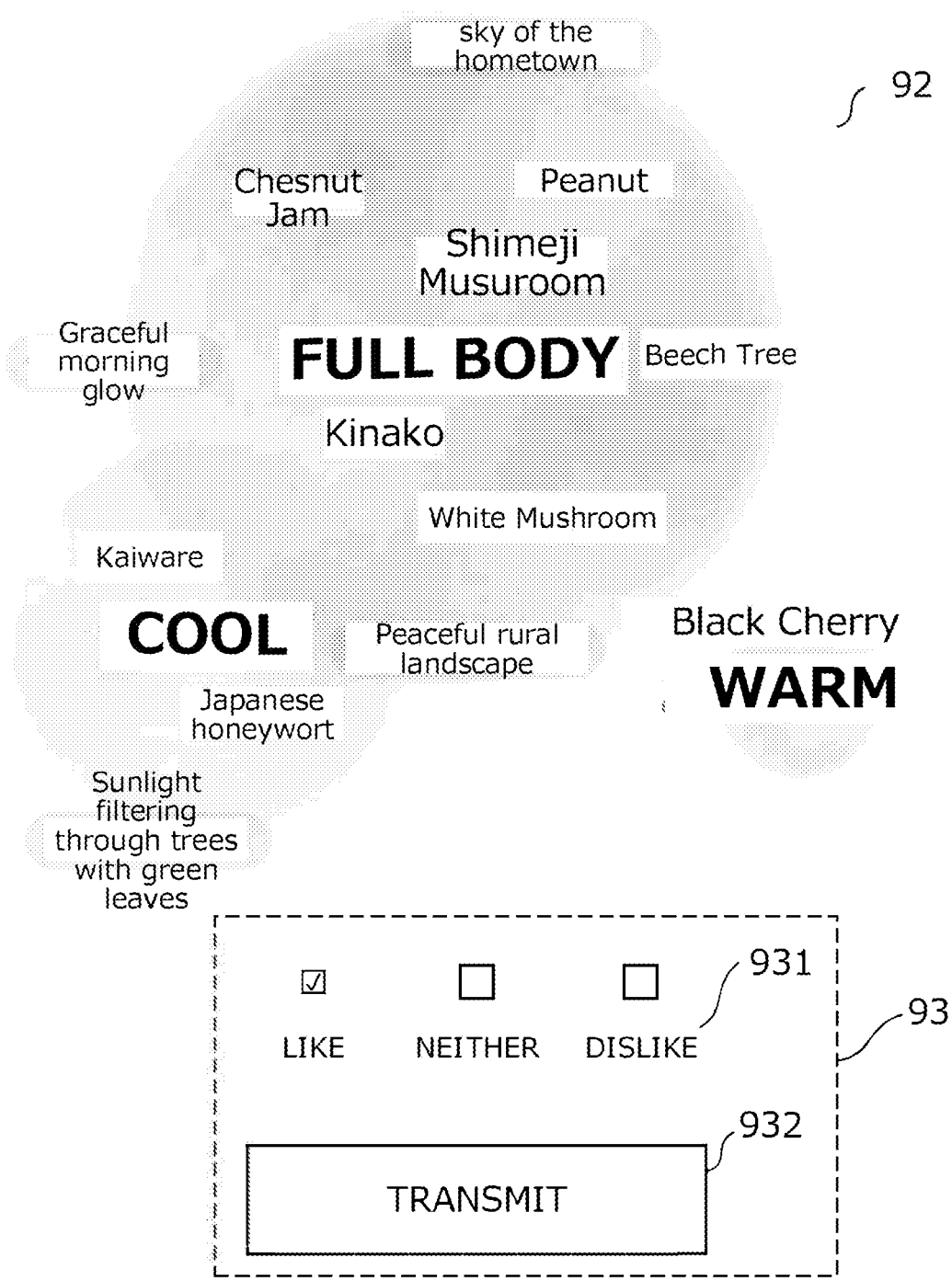
FIG. 7 shows a diagram exemplifying a display screen of a text indicating the flavor or aroma of the target Japanese rice wine.

FIG. 7 is a diagram showing an exemplary display screen of a text indicating the flavor or aroma of the target Japanese rice wine. The display screen includes display area 91, display region 92, and area 93. Display area 91 is an area for displaying the name and the sensibility representation of the target Japanese rice wine. Display area 92 is an area for displaying a plurality of words indicating the flavor or aroma of the target Japanese rice wine. In display area 92, a plurality of words indicating the flavor or aroma of the target Japanese rice wine are displayed on flavor map 921. The flavor map includes a figure showing the balance of the elements defined in the target Japanese rice wine line.

Figure 8:
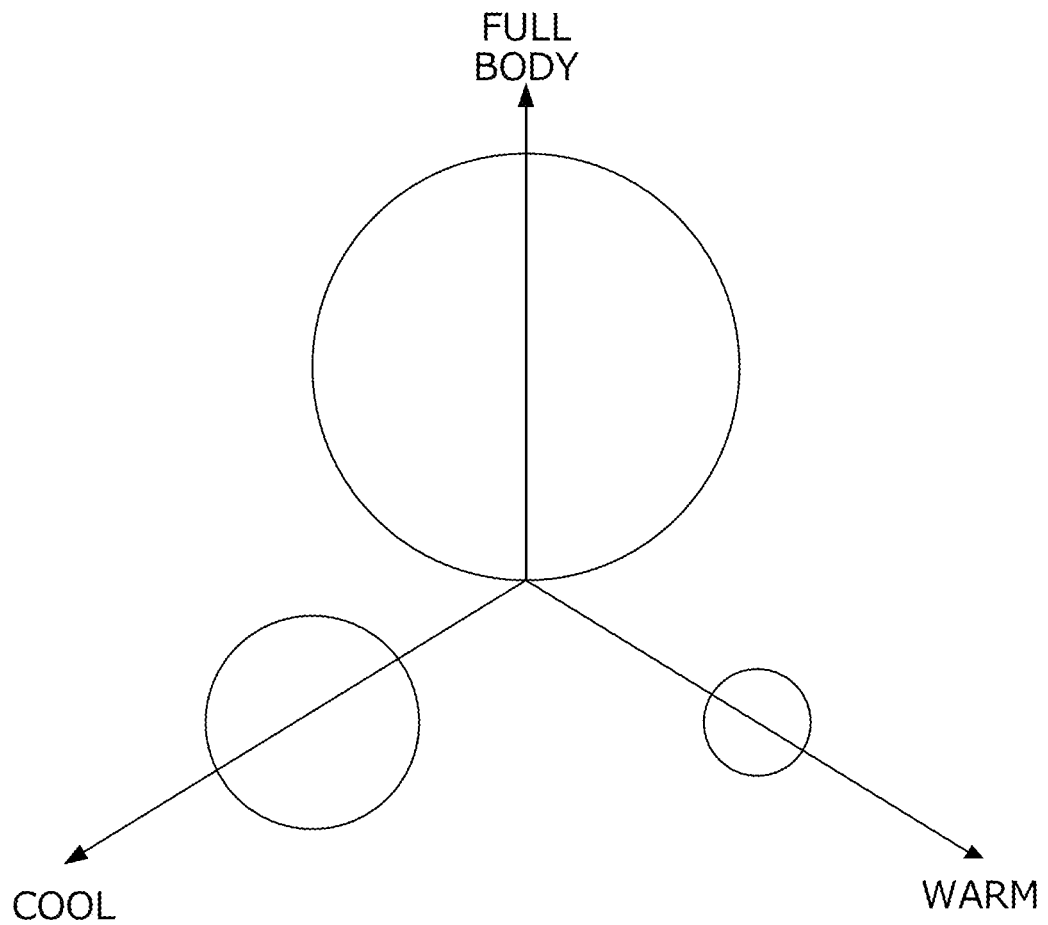
FIG. 8 shows a structure of flavor map.

FIG. 8 illustrates a structure of a flavor map. In the flavor map, an axis corresponding to an element constituting the system is set. In this example, three axes are set: a cool axis, a body axis, and a warm axis. Each axis is set equally in the direction of rotation with respect to the origin of the flavor map, i.e. at an angle of 120° with respect to each other in this example. The intensity of each element is expressed by the size of a circle centered on a reference point (which is a different point from the origin) set for each axis. In one example, if cool:full body:warm=2:4:1, the radius of the circle depicted in the flavor map is cool:full body:warm=2:4:1. Each element's circle is displayed using a different color.

Referring to FIG. 7 again, in the flavor map, the wording of the flavor representation is superimposed on a figure showing the balance of the system elements. In one example, the word(s) of the flavor representation is placed in a circle of each lineage element, with the stronger flavor representation being displayed near the center of the circle. The circumferential position or angle of the word(s) in the circle is predetermined for each flavor representation. Alternatively, the angle may be determined according to the number of flavor representations included in the systematic elements of the target Japanese rice wine (specifically, for example, a plurality of word(s) are evenly arranged in the circumferential direction).

In the flavor map, the words of the metaphorical expression are further displayed on the figure showing the balance of the lineage elements. In one example, the wording of the metaphoric representation is displayed in an appearance (specifically, typeface, color, size, decoration, or a combination thereof) that is different from the wording of the flavor representation. The metaphoric representation is, for example, arranged outside or on the circumference of the circle of the lineage element.

Area 93 is an area for displaying UI object 931 and UI object 932. UI object 931 is a UI object for inputting a preference for the target Japanese rice wine that the user senses while drinking the target Japanese rice wine. In this example, the preference of the user is input by three options of "like," "neither," and "dislike." UI object 932 is a UI object for instructing server 10 to transmit information indicating the selected word and the entered preference. It is of note that the preference is not limited to the three levels of "like," "neither," and "dislike." For example, two levels of "like" and "dislike" or a degree of preference may be expressed by N levels (N is a natural number of N 4).

At step S9, receiving means 16 receives the selection of the flavor or aroma that the user has sensed by eating and drinking the object to be used, and the inputting of the preference for the object to be used. On the screen shown in FIG. 7, a message "Please select the flavor or aroma that you sensed when you drank this Japanese rice wine" is also displayed. The flavor or aroma sensed by the user eating and drinking the target Japanese rice wine is selected by the user specifying a flavor representation or metaphorical expression displayed on the flavor map. Since the user's sensations are different from one user to another, for example, even if the expert judges that the Japanese rice wine "Ame Tsukuba" contains eight flavors, such as kaiware, Japanese honeywort, peanuts, beech trees, mushrooms, chestnuts, wax flour, black cherry, and shimeji mushroom, and records these flavor representations in database 111, it is not always possible for the individual user to sense all of these eight flavors. Even if a user drinks the same Japanese rice wine, one user may sense only the flavor of a beech tree, while another user senses the flavor of a flour and a chestnut bean paste, so that the flavor sensed by the individual users differs. The designation of the word is performed, for example, by the user touching a position where the word is displayed on the touch screen.

The user's preferences are entered via UI object 931. When the user instructs to transmit the word selected from UI object 932 and the information indicating the entered preference, client terminal 20 transmits the information to server 10. In server 10, storage means 11 stores information received from client terminal 20. Specifically, storage means 11 stores the identification information of the target Japanese rice wine and the information indicating the selected word and the input preference in association with the identification information of the session and the attribute information of the user. Hereinafter, the information indicating the selected word and the input preference input by the user is referred to as "feedback information." When sending of the feedback information to server 10 is completed, the process proceeds to step S9.

At step S10, presentation means 13 determines whether the input of the feedback information for all the Japanese rice wine included in the Japanese rice tasting set has been completed. When it is determined that the input of the feedback information has been completed for all the Japanese rice wine, presentation means 13 proceeds to step S11. When it is determined that there is Japanese rice wine for which the feed-back data has not yet been entered (S10:NO), presentation means 13 returns the process to step S6.

At step S11, specifying means 17 specifies a word(s) indicating a tendency of the preference of the user in accordance with the feedback information stored in storage means 11 in association with the identification information of the session. Specifically, first, specifying means 17 aggregates the feedback information.

FIG. 9 is a diagram illustrating feedback information. The feedback information includes, for each Japanese rice wine, a flavor representation, a metaphorical expression, and a preference that the user senses from the Japanese rice wine. In the example shown in the figure, it is recorded that the user senses the flavor or aroma of blueberry from Japanese rice wine "Ame Tsukuba," which is "like." Specifying means 17 refers to database 111 to obtain an index of each flavor representation. FIG. 9 also shows indices of flavor expressions obtained from database 111. Specifying means 17 aggregates, for each flavor representation, an index of the flavor expression for the Japanese rice wine that the user senses as "like" for the tasting set. For example, the flavor of kinako is included in three Japanese rice wines: "Ame Tsukuba," "Funado," and "Funado Junmai Daiginjo," and this user entered all three Japanese rice wines as "like." In "Ame Tsukuba," "Funado," and "Funado Junmai Daiginjo," the flavor indices of the kinako are, for example, 2, 3, and 4, respectively, for a total of 9 points. If the user enters "dislike" for Japanese rice wine "Funawa Junmai Daiginjo," "the flavor of kinako in "Funawa Junmai Daiginjo" is not considered.

Next, specifying means 17 extracts a flavor representation in which the total index is larger than the reference value from the aggregated feedback information. The reference value is predetermined by information processing system 1, and is, for example, 5. Consider, for example, an example in which the indices of kinakoand cocoa exceed a reference value. Both kinako and cocoa belong to the phylogenetic element "full-body." Therefore, specifying means 17 identifies that the flavor or aroma of "full-body" in terms of flavor representation match the preference of the user.

Further, specifying means 17 combines these pieces of information to specify (or generate) word(s) representing a tendency of the preference of the user. In this example, specifying means 17 generates the phrase "Japanese rice wine suited to your preference is a full-body system, which is a flavor of kinako and cocoa" for this user.

At step S12, specifying means 17 specifies the Japanese rice wine recommended to the user. Specifically, specifying means 17 searches the database 111 and extracts Japanese rice wine corresponding to the text specified at step S9. That is, specifying means 17 extracts Japanese rice wine under a search condition that the user is dominant in the system element "full-body" and includes kinako and cocoa as flavor representations from the tabulation result of the feedback information. When a plurality of Japanese rice wine is extracted, specifying means 17 gives priority to the plurality of Japanese rice wines. As the priority, for example, conditions such as prioritizing Japanese rice wine that is not included in the tasting set to which feedback information is input, prioritizing flavor representations included in the search condition (in this example, kinako and cocoa) that are relatively stronger than other flavor expressions, and prioritizing a total value of flavor expressions included in the search condition that is higher than when other Japanese rice wine are used alone or in combination.

This search excludes the ten bottles of Japanese rice wine that are included in the set of Japanese rice wine that has just been tasted. This is to encourage the purchase of products that have never been experienced. Depending on the merchandise configuration or the sales strategy of the business operator, ten bottles of Japanese rice wine included in the set of Japanese rice wine that has been tasted may also be included in the search target.

When specifying the Japanese rice wine recommended to the user, specifying means 17 may refer to the attribute information inputted in step S4. For example, in a case where the user is male, a recommended Japanese rice wine is selected from among the Japanese rice wines popular with males (in this case, information for specifying which Japanese rice wine is popular with males is recorded in advance in the database). Alternatively, specifying means 17 may narrow down the candidate Japanese rice wines to be recommended according to a residential location of the user. Specifically, a candidate is Japanese rice wine produced near the user's place of residence or in a region far from the user's place of residence. The candidate of the recommended Japanese rice wine may be narrowed down by an explicit instruction of the user.

At step S13, output means 18 outputs the word(s) specified by specifying means 17 and the information indicating Japanese rice wine to client terminal 20. Specifically, output means 18 transmits the text specified by specifying means 17 and data for displaying the Japanese rice wine on display means 14 to client terminal 20. In client terminal 20, display means 14 displays, in accordance with the data received from server 10, a word indicating the tendency of a user's preference and a screen indicating a recommended Japanese rice wine.

FIG. 10 is a diagram illustrating an example of a screen displayed on client terminal 20. This screen includes display area 95, display area 96, and display area 97. Area 95 is an area for displaying word(s) indicating a tendency of the user's preference. Area 96 is an area for displaying Japanese rice wine recommended to a user. Area 97 is an area for displaying a link to an EC website for purchasing Japanese rice wine recommended to the user. In the example in FIG. 10, area 96 displays information and an image (for example, a manufacturer of the Japanese rice wine, a price, an image of a label, and the like) related to the Japanese rice wine recommended to a user.

According to the present embodiment, by inputting the feedback of the flavor or the flavor sensed when the user actually consumes a predetermined set of objects, the user can obtain the word(s) indicating the tendency of the user's preference and the information on the recommended object. Since the tendency of the user's preference is verbalized, the user can easily communicate his/her preference to the store clerk when selecting the next object.

In addition, a link to an EC website for purchasing the recommended object is displayed so that a user can easily purchase the recommended object.

3. Modification

The present invention is not limited to the embodiments described above, and various modifications can be available. Some variations will be described below. Two or more item of the following modifications may be combined.

3-1. Order in which Objects are Presented

The order in which a set of objects are presented in the embodiment has been described as an example defined in database 111. However, the order in which the objects are presented is not limited to this example. For example, presentation means 13 may change the order of presenting the objects based on the flavor or aroma and the preference input by a user. In particular, presentation means 13 may then preferentially present an object having a flavor or aroma common to the flavor or aroma previously entered by the user with an indication of the preference of "like." Alternatively, presenting means 13 may preferentially present the object having no flavor or aroma in common with the flavor or aroma previously input by the user. In another example, presenting means 13 may present the object included in the metaphorical expression or the sensitive expression in preference to the object in which the preference of "favorite" is input (for example, "sunset" and "goose," "first love" and "youth"), in preference to the object included in the metaphorical expression or the sensitive expression. The similarity of the words is determined by referring to a synonym dictionary included in server 10 or another server, for example. According to this example, the order in which the objects are presented to the user can be changed based on the flavor or the aroma and the preference input so far by the user. As a result, for example, it is expected that a common flavor can be easily found in a plurality of objects, or that a difference from other objects can be easily understood.

3-2. Words Displayed on the Flavor Map

The phrases displayed on the flavor map are not limited to those illustrated in the embodiment. In the embodiment, an example has been described in which all of the lines, flavor representations, metaphorical expressions, and sensibility expressions included in the records of the Japanese rice wine are displayed in database 111. However, not all the information recorded in database 111 needs to be displayed on the flavor map, and at least some of the information may be omitted (or the information to be displayed may be selected) at the time of display. As an example, when selecting the information to be displayed, display control means 15 may select a predetermined number in order from the one having a strong flavor representation (or, when selecting the information to be omitted, display control means 15 may select a predetermined number in order from the one having a weak flavor expression intensity). In another example, in selecting the information to be displayed or the information to be omitted, display control means 15 may take into account the flavor or aroma and preferences previously input by a user. Specifically, display control means 15 may preferentially select, as the information to be displayed, a flavor representation common to the flavor or the flavor input by the user with the preference of "favorite" so far. This means that the words displayed in the flavor map change or are determined depending on the flavor or aroma and preferences previously entered by the user. Alternatively, the words displayed on the flavor map may be the same, but the appearance of the wording may be changed depending on the flavor or aroma and preference previously input by the user. For example, the user may highlight a flavor or aroma representation common to the flavor or aroma previously entered with the preference of "favorite" or may highlight a flavor expression not common to the flavor or aroma previously entered with the preference of "favorite." According to this example, the words displayed in the flavor map can be changed based on the flavor or the flavor and the preference input so far by the user. As a result, for example, it is expected that a common flavor in a plurality of objects can be easily searched, or that a difference can be easily understood.

3-3. Proposal of a Combination of Objects

In the embodiment, the tasting set is predefined in database 112 in combination (i.e., the contents of the set), but server 10 may propose a new tasting set in response to a user's request.

Figure 11:
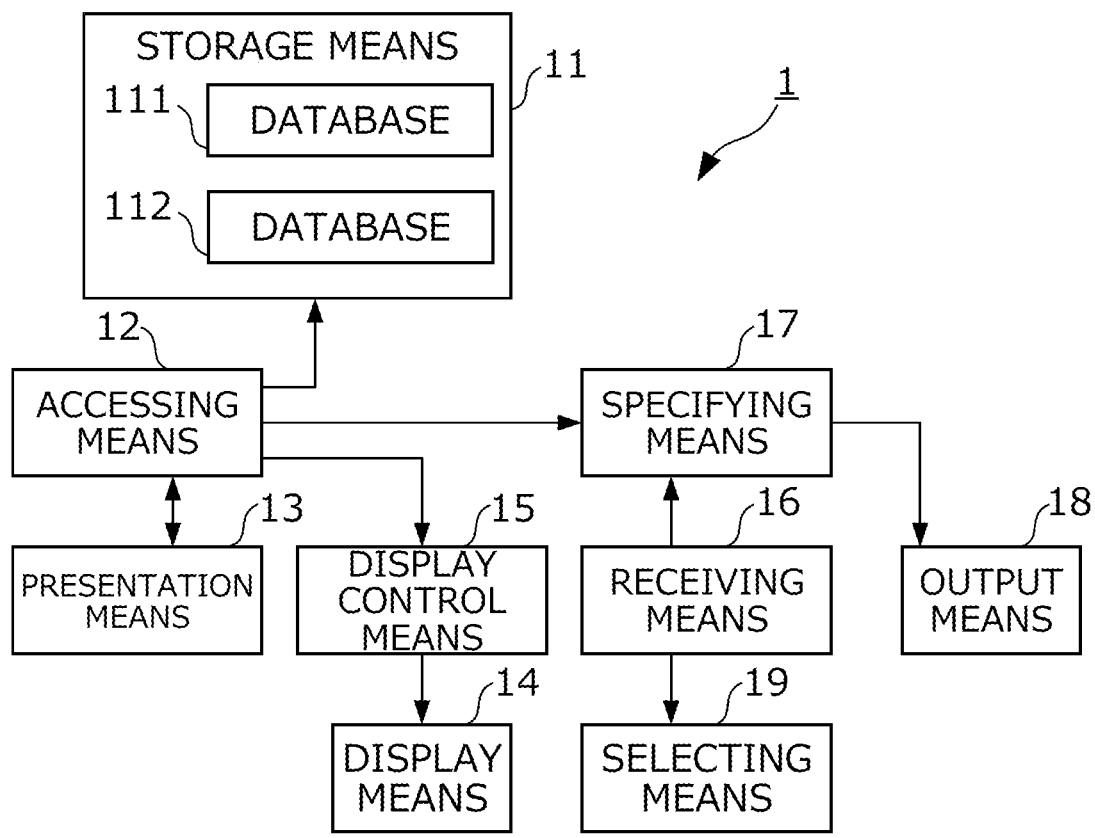
FIG. 11 shows a functional configuration of information processing system 1 according to the modification.

FIG. 11 is a diagram exemplifying a functional configuration of an information processing system 1 according to this modification. In this modification, information processing system 1 further includes selecting means 19. Receiving means receives specified M types (M<N) of objects. The number M is determined in advance by information processing system 1, for example. Alternatively, the number M may be set to an upper limit and may be selected by a user within the range. Selecting means 19 refers to the database 111 and selects the remaining (N-M) types of objects so that the distribution of a plurality of sentences indicating the flavor or aroma of the N types of objects constituting the newly proposed set of objects satisfies a predetermined condition. The details are as follows.

Since it is very difficult for the user to select all of a set of 10 Japanese rice wines, a part of the set, for example, three Japanese rice wine, is designated as his/her preference. The user inputs identification information of three Japanese rice wine items designated by the user. Receiving means 16 receives the input of the identification information. Hereinafter, the selecting means 19 selects the remaining seven Japanese rice wines.

The selecting means 19 first analyzes the systematic elements of Japanese rice wine designated by the user. The selecting means 19 selects the system elements such that the distribution of the system elements in one set of Japanese rice wine is substantially uniform. For example, in a case where the lineage elements of three Japanese rice wine designated by the user are "cool," "full-body," and "warm," one by one, the selecting means 19 selects at least two Japanese rice wines having the lineage element of "cool," at least two Japanese rice wines having the lineage element of "full-body," and at least two Japanese rice wines having the lineage element of "warm."

Further, selecting means 19 selects another Japanese rice wine so that a certain amount of overlap occurs between the Japanese rice wine designated by the user and the flavor representation. For example, selecting means 19 specifies one Japanese rice wine from the Japanese rice wines designated by the user, and calculates a similarity measure between the flavor representation of the Japanese rice wine and the flavor expression of the Japanese rice wine as a candidate. Similarity measure is calculated, for example, by taking the product of the intensity values of the flavor representation and adding this to all the flavor representations. Selecting means 19 selects the Japanese rice wine with the highest calculated similarity measure. In this way, selecting means 19 selects three Japanese rice wines whose flavor representation is similar to that of the Japanese varieties designated by the user. Further, selecting means 19 selects four Japanese rice wine pieces having similar flavor representations to the three newly selected Japanese rice wines. In addition, when the three Japanese rice wine lines designated by the user are biased (for example, when all the Japanese rice wine lines are the "cool" lines), since there is no Japanese rice wine line designated by the user for the "full body" and "Warm" lines, the selecting means 19 selects one Japanese rice wine according to some method, and further selects another Japanese rice wine whose flavor representation is similar to that of the Japanese rice wine.

According to this example, only by the user specifying several kinds of Japanese rice wine, the remaining Japanese rice wine is automatically selected in order to constitute a set of Japanese rice wines adapted to the method adopted in information processing system 1. Note that the user in this example may be a general consumer or may be an employee of a dealer. The employee of the dealer can determine the contents of the tasting set conforming to the method adopted in information processing system 1 only by specifying several kinds of Japanese rice wine to be promoted, for example.

3-4. Specifying a Word(s) Indicating Preference Trends

The method of identifying or generating a word(s) indicating the tendency of the preference of the user is not limited to the examples described in the embodiment. AI (Artificial Intelligence) or machine-learning techniques may be used to identify or generate wording indicative of user preference trends. In this case, specifying means 17 can access a learned model (not shown). This learned model is a machine learning model having an input layer, an intermediate layer, and an output layer, and is a model in which identification information of a set (i.e., a plurality of) of Japanese rice wines and information indicating a flavor and a preference actually sensed by a user who drinks the plurality of Japanese rice wines are provided to an input layer by an expert based on information indicating the flavor and the preference, and a word indicating a tendency of the preference of the user is given to an output layer as teacher data to perform machine learning. According to this example, database 111 can be simplified or omitted. Further, the training may be performed by including the attribute information of the user in the teacher data provided to the input layer.

3-5. Specific of Recommended Japanese Rice Wine

The method of identifying the Japanese rice wine recommended to a user is not limited to the one exemplified in the embodiment. AI or machine-learning techniques may be used to identify the Japanese rice wine recommended to the user. In this case, specifying means 17 can access a learned model (not shown). The learned model is a machine learning model having an input layer, an intermediate layer, and an output layer, and is a model in which a word(s) indicating a tendency of a user's preference is given to an input layer by an expert based on the word(s), and the Japanese rice wine recommended to the user is given to an output layer as teacher data to perform machine learning. According to this example, database 111 can be simplified or omitted. Further, the training may be performed by including the attribute information of the user in the teacher data given to the input layer.

3-6. Other Modifications

The method of specifying the service site in information processing system 1 is not limited to the one illustrated in the embodiment. For example, the application program installed in client terminal 20 may include information specifying a service site, and when the user activates the application program, the application program may automatically connect to the service site.

The data structure of database 111 is not limited to that illustrated in the embodiment. For example, the sensitive expression may belong to any one of the lineage elements. The intensity of the metaphorical and sensitive expression may also be recorded in database 111.

Although an example in which the contents of the tasting set are defined in database 112 has been described in the embodiment, the contents of the tasting set may not be defined in server 10. In this case, when accessing server 10 from client terminal 20, the identification information of ten Japanese rice wines included in the tasting set is transmitted. The identification information of these ten Japanese rice wine is included in, for example, a two-dimensional image code described in a leaflet included in the tasting set.

The object of information processing system 1 is not limited to Japanese rice wine. It may be an alcoholic beverage other than a Japanese alcoholic beverage such as wine or beer, a non-alcoholic beverage such as coffee, black tea or green tea, a seasoning such as olive oil or vinegar, a foodstuff such as buckwheat or pasta, or a cosmetic such as perfume or soap.

The display screen shown in the embodiment is merely an example. Part of UI objects illustrated in the embodiments may be omitted, or UI objects not illustrated may be added.

The functional configuration of information processing system 1 is not limited to that illustrated in the embodiment. Part of the functions of information processing system 1 may be omitted, or functions not described in the embodiment may be added. In an example, output means 18 may not output the recommended information of Japanese rice wine simply by outputting word(s) indicating the tendency of a user's preference.

The hardware configuration and the correspondence relationship between the hardware configuration and the functional configuration of information processing system 1 are not limited to those illustrated in the embodiment. For example, a plurality of computer devices may physically cooperate with each other to function as server 10. Server 10 may be a physical server or a virtual server. In the embodiment, at least a part of the functions described as those of the servers 10 may be implemented in the client terminal 20. In this case, client terminal 20 may function as an "information processing device" of the present invention.

The flowchart illustrated in the embodiment is merely an example. The order of some of the steps may be changed, or some of the steps may be omitted. For example, the step of receiving the input of the attribute information of a user may be omitted. Alternatively, the step of outputting (for example, displaying) Japanese rice wine recommended to the user may be omitted.

A program executed by a processor such as a CPU 101 may be provided in a state of being recorded in a computer-readable recording medium such as a CD-ROM (Compact Disc Read Only Memory), or may be provided in a state of being downloadable via a network such as the Internet.

The invention claimed is:

1. An information processing device comprising:
an access means for accessing a database recording a plurality of words indicating, for each of a plurality of objects, flavor or aroma of an object;
a presenting means for presenting to a user an object to be used from among a set of determined objects in order;
a display control means for causing a display to display a plurality of words obtained from the database indicating the flavor or aroma of the object to be used;
a receiving means for receiving a selection of the flavor or aroma sensed by the user using the object to be used and the input of the preference for the object to be used from among the plurality of words; and
an output means for:
extracting words that show the tendency of the user's preference according to the selection and the input, in a case that the selection and the input regarding all the objects that constitute the set of determined objects are received, and
concurrently outputting a phrase verbalizing the tendency of the user's preference generated by combining the extracted words and information for specifying another object not included in the set of determined objects among the plurality of objects selected according to words indicating the tendency of the preference of the user for making a recommendation to the user, wherein
the plurality of words are displayed on a flavor map with three axes, each axis corresponding to a flavor classification recorded in the database,
positioning of the words on the flavor map and sizing of display elements are determined by numerical intensity values for each classification obtained from the database, and
the numerical intensity values include (i) lineage element intensity values that determine sizes of the display elements positioned along a respective axis and (ii) individual flavor representation intensity values that determine radial positioning of each word of the plurality of words within each display element.

2. The information processing device according to claim 1, wherein
the output means outputs the information for recommending, as the other object, an object included in a plurality of words indicating the flavor or aroma of the object and a word corresponding to the word indicating the tendency of the preference of the user in the database from among the plurality of objects to the user.

3. The information processing device according to claim 1, wherein
the presenting means presents the user with the object to be used, determined according to the order changed based on the flavor or aroma and preference previously input by the user.

4. The information processing device according to claim 1, wherein
the display control means causes the display to display a word indicating the flavor or aroma of the object to be used, which has been changed based on the flavor or aroma and preference input so far by the user.

5. The information processing device according to claim 1, wherein
the database includes, as the plurality of words, a food name in which the flavor or aroma of the object is classified into any of a plurality of lineages for each of the plurality of objects.

6. The information processing device according to claim 1, wherein
the set of determined objects is composed of N types of objects,
the receiving means receives designation of M types (M<N) objects,
the information processing device refers to the database, and
the information processing device further comprises a selecting means for selecting an object of the remaining (N-M) type, provided so that a distribution of a plurality of words indicating flavors or aromas of N types of objects constituting the set of determined objects satisfies a predetermined condition.

7. An information processing method comprising:
accessing a database recording a plurality of words indicating, for each of a plurality of objects, flavor or aroma of an object;
presenting to a user an object to be used from among a set of determined objects in order;
causing a display to display a plurality of words obtained from the database indicating the flavor or aroma of the object to be used;
receiving a selection of the flavor or aroma sensed by the user using the object to be used and the input of the preference for the object to be used from among the plurality of words;
extracting words that show the tendency of the user's preference according to the selection and the input, in a case that the selection and the input are received regarding all the objects that constitute the set of determined objects, and concurrently outputting a phrase verbalizing the tendency of the user's preference generated by combining the extracted words and information for specifying another object not included in the set of determined objects among the plurality of objects selected according to words indicating the tendency of the preference of the user for making a recommendation to the user, wherein the plurality of words are displayed on a flavor map with three axes, each axis corresponding to a flavor classification recorded in the database, positioning of the words on the flavor map and sizing of display elements are determined by numerical intensity values for each classification obtained from the database, and the numerical intensity values include (i) lineage element intensity values that determine sizes of the display elements positioned along a respective axis and (ii) individual flavor representation intensity values that determine radial positioning of each word of the plurality of words within each display element.

8. A non-transitory computer-readable medium, comprising a program causing a computer device to execute a process, the process comprising:

accessing a database recording a plurality of words indicating, for each of a plurality of objects, flavor or aroma of an object;

presenting to a user an object to be used from among a set of determined objects in order;

causing a display to display a plurality of words obtained from the database indicating the flavor or aroma of the object to be used;

receiving a selection of the flavor or aroma sensed by the user using the object to be used and the input of the preference for the object to be used from among the plurality of words;

extracting words that show the tendency of the user's preference according to the selection and the input, in a case that the selection and the input are received regarding all the objects that constitute the set of determined objects, and concurrently outputting a phrase verbalizing the tendency of the user's preference generated by combining the extracted words and information for specifying another object not included in the set of determined objects among the plurality of objects selected according to words indicating the tendency of the preference of the user for making a recommendation to the user, wherein the plurality of words are displayed on a flavor map with three axes, each axis corresponding to a flavor classification recorded in the database, positioning of the words on the flavor map and sizing of display elements are determined by numerical intensity values for each classification obtained from the database, and the numerical intensity values include (i) lineage element intensity values that determine sizes of the display elements positioned along a respective axis and (ii) individual flavor representation intensity values that determine radial positioning of each word of the plurality of words within each display element.

* * * * *